June 2, 1925.

T. H. ROLAND 1,540,224

AUTOMATIC FUEL CUT-OFF FOR STEAM BOILERS

Filed Sept. 22, 1921

INVENTOR.
THOMAS H. ROLAND
BY A. B. Bowman
ATTORNEY

Patented June 2, 1925.

1,540,224

UNITED STATES PATENT OFFICE.

THOMAS H. ROLAND, OF SAN DIEGO, CALIFORNIA.

AUTOMATIC FUEL CUT-OFF FOR STEAM BOILERS.

Application filed September 22, 1921. Serial No. 502,522.

*To all whom it may concern:*

Be it known that I, THOMAS H. ROLAND, a citizen of the United States, residing at San Diego, in the county of San Diego and State of California, have invented certain new and useful Automatic Fuel Cut-Offs for Steam Boilers, of which the following is a specification.

My invention relates to an apparatus for automatically shutting off the flow of fuel to steam boilers in accordance with the water level in said boiler, more particularly adapted for gas burners and the objects of my invention are: First, to provide an apparatus which will shut off the flow of fuel to the boiler when the water reaches a certain predetermined low level in the boiler thus eliminating any danger of explosion because of low water in the boiler; second, to provide an apparatus of this class which is automatic and is operated by the certain position of the water level in the boiler; third, to provide an apparatus of this class which is used in connection with the water gauge of the boiler so that when the water becomes low in the water gauge the fuel will be automatically closed off; fourth, to provide an apparatus of this class in which the quantity of water at water level in the boiler forms a counterbalance for a weight which operates a valve in the fuel feed line thereby controlling the fuel in the feed line relatively to the height of the water in the boiler; fifth, to provide an apparatus of this class which will automatically open the fuel feed line as soon as a sufficient quantity of water is placed in the boiler and sixth, to provide an apparatus of this class which is simple and economical of construction, easy to install, applicable for use in connection with all the makes of boilers with fuel feed lines, particularly gas, automatic in its action, efficient, durable and reliable.

Figure 1:
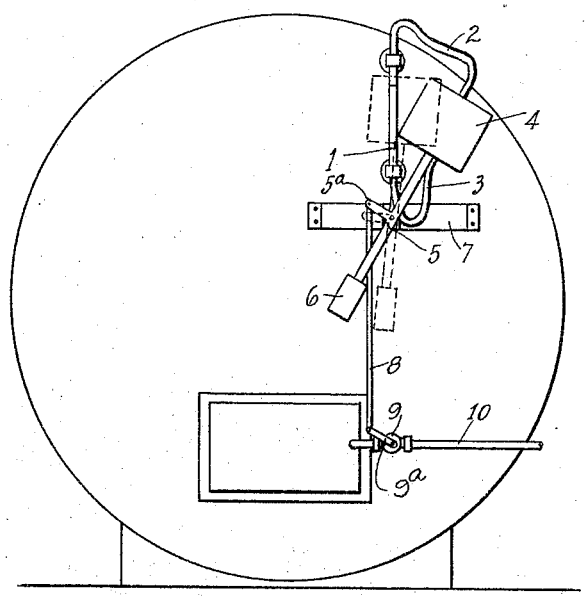
Figure 2:
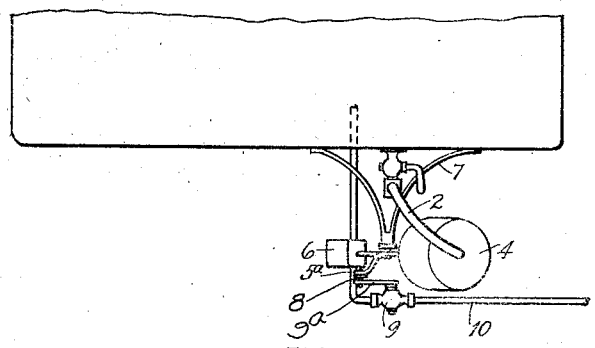

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of my apparatus shown in connection with a boiler and ready for use and Fig. 2 is a top or plan view thereof showing the boiler fragmentarily.

Similar characters of reference refer to similar parts and portions throughout the several views of the drawings.

The water gauge 1, and hose 2 and 3, water receptacle 4, receptacle supporting lever 5, weight 6, supporting member 7, rod 8, valve 9, and fuel feed conductor 10 constitute the principal parts and portions of my fuel control apparatus for boilers.

The water gauge 1 is an ordinary gauge for indicating the water level in boilers except that I have connected a hose 2 with the upper end of the gauge and a hose 3 with the lower end of said gauge thus providing for water circulation. These hose 2 and 3 communicate with a receptacle 4 which is a hollow receptacle adapted for holding a certain quantity of water which seeks the same level in said vessel as in the gauge and in the boiler. It will be noted that these hose 2 and 3 are flexible enough so that the receptacle 4 may move relatively to the gauge 1. This receptacle 4 is supported by means of the supporting lever 5 which is pivotally mounted intermediate its ends on a support 7 which support may be used in any position desired so that the receptacle 4 is supported in certain relative position. Mounted on the other end of this lever 5 is a counterweight 6 which is adapted to counterbalance the receptacle 4 when said receptacle contains only a certain amount of water. It will be noted that the lever 5 should never come to a vertical position but remain slightly tilted at all times as shown by dotted line in Fig. 1 of the drawing. Extending from the member 5 adjacent its pivotal mounting is an arm $5^a$ to the extended end of which is pivotally connected a bar 8 which extends downwardly and pivotally connected with its opposite end is the extended arm $9^a$ of the valve 9, which valve 9 is a valve in the fuel feed line 10 to the boiler burner.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

It is obvious that with this construction there is provided an apparatus which will automatically shut off the fuel supply to the burner of a steam boiler when the water becomes dangerously low in the boiler or reaches a certain predetermined level; that the water will circulate and attain the same level in the receptacle 4 as in the boiler and water gauge; that when it is of sufficient height the receptacle 4 is positioned as shown by solid lines in Fig. 1 of the drawings on an angle; that when the water becomes low the receptacle 4 will become lighter and the weight 6 will balance it so that it attains a position shown by dotted lines in Fig. 1 of the drawings which in turn will move the rod 8 and in turn close the valve 9 which is the fuel supply valve for the burner of the boiler; that when sufficient water is placed in the boiler the vessel 4 will again assume the position shown by solid lines opening the valve in the fuel line and is ready for operation.

Having thus described my invention what I claim as new and desire to secure by Letters Patent is:

1. An automatic fuel cutoff for steam boilers, including a boiler, a supporting member, a supporting lever pivotally mounted thereon adapted to assume a nearly vertical position, a water receptacle mounted on the one end thereof, a weight mounted on the other end thereof said weight normally overbalancing said water receptacle, flexible water conductors communicating with said receptacle and with the water gage of said boiler, a fuel feed controlling valve, means connecting said fuel controlling valve with said lever comprising an arm extending from said lever and a connecting rod connecting the extended end of the arm with said lever and said valve.

2. An automatic fuel cutoff for steam boilers, including a boiler, a supporting member secured to the outer surface thereof, a supporting lever pivotally mounted on said supporting member, a water receptacle mounted on the one end of said lever, a weight mounted on the other end of said lever said weight normally overbalancing said receptacle, a water gage secured to said boiler above the pivotal mounting of said lever in the path of said water receptacle, a flexible water conductor communicating with the upper end of said water gage and with the upper side of said water receptacle, another flexible water conductor communicating with the lower end of said water gage and with the lower side of said water receptacle, a fuel feed control valve mounted on the exterior of said boiler for controlling the fuel to the fire-box of said boiler, and means connecting said feed controlling valve with said lever, whereby the fuel to the boiler will be cut off upon the movement of said lever caused by the lowering of the water in said water receptacle.

In testimony whereof, I have hereunto set my hand at San Diego, California, this 16th day of September, 1921.

THOMAS H. ROLAND.